(12) United States Patent
Rogers et al.

(10) Patent No.: US 9,282,825 B1
(45) Date of Patent: Mar. 15, 2016

(54) LUMBAR SUPPORT ADJUSTMENT MECHANISMS

(71) Applicant: Exemplis Corporation, Cypress, CA (US)

(72) Inventors: Brett Joseph Rogers, Tustin, CA (US); Ken-Soh Mai, Torrance, CA (US); Yoshimi Yamamoto, Irvine, CA (US); Matthew J. Gerules, Corona, CA (US)

(73) Assignee: Exemplis LLC, Cypress, CA (US)

( * ) Notice: Subject to any disclaimer, the term of this patent is extended or adjusted under 35 U.S.C. 154(b) by 0 days.

(21) Appl. No.: 14/591,424

(22) Filed: Jan. 7, 2015

(51) Int. Cl.
*A47C 7/46* (2006.01)
*A47C 3/00* (2006.01)
*B60N 2/66* (2006.01)

(52) U.S. Cl.
CPC ... *A47C 7/46* (2013.01); *A47C 3/00* (2013.01); *A47C 7/462* (2013.01); *B60N 2/66* (2013.01)

(58) Field of Classification Search
CPC ............ B60N 2/66; A47C 7/462; A47C 3/00; A47C 7/46
USPC ............................................ 297/284.4, 284.7
See application file for complete search history.

(56) References Cited

U.S. PATENT DOCUMENTS

| | | | |
|---|---|---|---|
| 2,550,831 A | 5/1951 | Lingenfelter | |
| 4,182,533 A | 1/1980 | Arndt et al. | |
| 4,469,374 A | 9/1984 | Kashihara et al. | |
| 4,632,454 A * | 12/1986 | Naert | 297/284.4 |
| 5,286,087 A | 2/1994 | Elton | |
| 6,062,649 A | 5/2000 | Nagel et al. | |
| 6,079,785 A | 6/2000 | Peterson et al. | |
| 6,189,972 B1 * | 2/2001 | Chu et al. | 297/284.4 X |
| 6,695,403 B1 | 2/2004 | Su | |
| 7,083,231 B2 | 8/2006 | Schuster, Sr. et al. | |
| 2009/0174241 A1 | 7/2009 | Pattyn et al. | |
| 2009/0184553 A1 | 7/2009 | Dauphin | |

* cited by examiner

*Primary Examiner* — Anthony D Barfield
(74) *Attorney, Agent, or Firm* — Erik Birkeneder; Nixon Peabody LLP

(57) ABSTRACT

A lumbar support adjustment system for a chair that allows a user to adjust the lumbar support by moving a handle on the side of the chair back. The lumbar support and handle move along separate tracks that diverge from each other as the lumbar support is adjusted upward. To compensate for this divergence, the system includes a linkage with a joint connected to the handle and another joint connected to the lumbar support. As the lumbar support is adjusted, the linkage and joint system accommodates for the divergence of the tracks to continue transmitting force from the handle to adjust the lumbar support.

30 Claims, 13 Drawing Sheets

LUMBAR SUPPORT ADJUSTMENT MECHANISMS

FIELD

The present invention is directed to the field of lumbar support adjustment mechanisms.

BACKGROUND

The following description includes information that may be useful in understanding the present invention. It is not an admission that any of the information provided herein is prior art or relevant to the presently claimed invention, or that any publication specifically or implicitly referenced is prior art.

The natural curvature of the lumbar vertebrae (of the lower back) ensures that the vertebral discs experience an even distribution of pressure. If a person sits in a chair without lumbar support, their lumbar vertebrae may be straightened or pushed out of the curved position. This unnatural curvature of the spine causes uneven pressure on the discs, which can eventually cause the discs to herniate.

Therefore, office chairs typically include lumbar support systems that help guide the lumbar vertebrae into an optimally curved position. A lumbar support generally has a curved profile that bulges outward from a chair towards the lower back. When a user sits in a chair, their lumbar vertebrae are guided into a curved orientation to maximize the reduction of uneven stress on the vertebral discs, and provide a more even distribution of pressure across the discs.

Furthermore, as individual users are of different heights and sizes, lumbar supports provide optimal support if they can be adjusted to the center of the lumbar vertebrae of each individual that sits in a chair. This ensures that the lumbar support will provide optimal curvature support.

SUMMARY

Users can most easily adjust a lumbar support while sitting in a chair, so that they can move the support to the correct position with their lower back as a guide. However, because the lumbar support is behind the chair, a user will either have to get up from their chair and adjust the support, or reach around in an awkward position. Furthermore, some lumbar supports slide down, and do not remain in place and therefore must be constantly adjusted. Accordingly, a need exists for an adjustable lumbar support that is easily adjustable while a user is sitting in a chair.

Therefore, the inventors of this technology developed a lumbar support adjustable by levers or handles located on the side of the chair, for example, near the outside edge of the chair back. Additionally, if a user is adjusting a lumbar support in a sitting position, the user will be able to more easily adjust the handle if it is located closer to the seat rather than higher along the back of the chair. For instance, the user's arm would be in an awkward, bent position if the handle is located near the top of the seat back. Therefore, the closer the handle is to the seat or the bottom of the seat back, generally the easier it is for a user to adjust the lumbar support. This is because the user's muscles have greater mechanical advantage when the arm is extended rather than bent.

In some embodiments, the lumbar adjustment system includes two divergent tracks; one for the handle and one for the lumbar support. The two lumbar tracks provides the user an uncompromised lumbar support position and adjustability to optimize back health while retaining an optimal handle placement along the entirely of the lumbar track. Additionally, in some embodiments, a three-dimensionally divergent outer handle track allows for an uncompromised chair aesthetic and profile, while allowing for a consistent hand-to-handle experience along the entirety of the lumbar track. Otherwise, the handle track may be designed to fit the ideal shape of the chair back and thus render the handle impossible to control or result in other undesirable effects, in the attempt to match the two-dimensional internal lumbar track. Due to multiple ergonomic needs, the internal lumbar and the external handle/controller track motions are separate and thus required an innovative method of mechanically bridging their differences and inherent divergent behavior.

The applicants have invented a system to adjust the lumbar support by lowering and raising a handle that runs on a track near the outside edge of the seat back. Because the handle for adjustment is separate from the lumbar support and runs on a separate track, the adjustment mechanism required a mechanical connection between the two that provided enough rigidity to transfer the force from the handle to the lumbar support.

Because the handle runs along a track on the outside of the seat back, in some embodiments it diverges from the lumbar support as it is adjusted upward. This is because the lumbar support moves up and down on a track that is straight vertically. However, the handle's track runs along the edge of the seat back, which may run non-parallel to the lumbar support track toward the top, and also bend back in a non-parallel and non-concentric way away from the user's back and lumbar support. Accordingly, the two tracks may diverge from each other in both the plane of the seat back and a plane perpendicular to the plane of the seat back (the sagittal plane of the user). Accordingly, the disclosed adjustment mechanism compensates for divergent movement between the tracks while still transferring sufficient force.

Accordingly, the inventors developed a system that utilizes a linkage that includes a joint on either side of the linkage that mechanically links the lumbar support to the handle. In some embodiments, then linkage may be an elongated stiff member, such as a metal or hard plastic that includes two joints: one of which is connected the lumbar support and the other to the handle. In some embodiments, both of the joints will have only three degrees of freedom (only rotational and no translational) so that they can move relative to each other, but continue to rigidly transmit force applied by a user's hand, to the handle and to the lumbar support. This allows the linkage to change orientation and accommodate for divergence between the lumbar support and handle, while maintaining enough rigidity to efficiently transmit force. Additionally, the mechanical linkage allows the handle to be positioned lower on the seatback than the actual lumbar support, allowing a user to more easily move the lumbar support into the correct position using the handle.

The joints may be any suitable joints with the requisite degrees of freedom to allow the linkage and joint system to compensate for the divergent movement between the handle and lumbar support tracks while transmitting sufficient motile force. For example, in some embodiments, two ball and socket joints may be used with the "socket" portion on either the linkage, lumbar support, or connection to the handle. Accordingly, the ball portion of the joint may be built onto the lumbar support/handle portion, or may be attached on both ends to the linkage.

In other embodiments, an open ring joint may be used at both ends, which allows for three degrees of freedom similar to ball and socket joints, but does not require the joints to have a "socket" that nearly entirely encloses the ball. In still other embodiments, the joint connecting the linkage to the lumbar support may only have one degree of freedom. For example, it may rotate, with an axis of rotation roughly in the plane of the back of the chair. This will allow the linkage member to extend outward from the seatback, to compensate for the handle track bending away from the user's back and lumbar support. In this embodiment, the linkage member may also have a pin joint that connects to the handle and that allows for five or six degrees of freedom. For instance, the pin and slider joint may allow for a pin to rotate and also slide in a slot away and towards the center of the chair to compensate for lateral movement.

Additionally, other joints could be developed that would be within the scope of this invention, particularly other joints that would be placed on either side of an elongated member. For example, combinations of hinge joints and others may be utilized.

In some embodiments, disclosed is a lumbar support adjustment system for a chair that include a lumbar support; a lumbar-side linkage retainer connected to the lumbar support; a handle; a handle-side linkage retainer connected to the handle; and a linkage with a lumbar joint and a handle joint, wherein the lumbar joint is connected to the lumbar-side linkage retainer and the handle joint is connected to the handle-side linkage retainer. In some embodiments, the lumbar and/or handle joints may either be an open ring joint, a ball and socket joint, a hinge joint, or a pin and slider joint.

In some embodiments, disclosed is a lumbar support adjustment system that includes a lumbar support that is engaged with a first track that follows a first path that is oriented vertically along a chair back; a handle that is engaged with a second track that follows a second path near an edge of the chair back and where the second path diverges from the first path; a lumbar-side linkage retainer connected to the lumbar support; a handle-side linkage retainer connected to the handle; and a linkage with a lumbar joint and a handle joint, and wherein the lumbar joint is connected to the lumbar-side linkage retainer and the handle joint is connected to the handle-side linkage retainer.

In some embodiments, the lumbar joint is a complementary portion of an open ring joint, a ball and socket joint, or a hinge joint. In other embodiments, the handle joint is a complementary portion of an open ring joint, a ball and socket joint, or a hinge joint. In some embodiments, the lumbar support is slidably engaged with the first track or includes rollers that roll along the first track. In further embodiments, the lumbar-side linkage retainer incorporates a socket portion of the open ring joint. In some embodiments, the lumbar joint incorporates a ring portion of the open ring joint. In other embodiments, the lumbar-side linkage retainer incorporates a ring portion of the open ring joint. In other embodiments, the lumbar joint incorporates a socket portion of the open ring joint. In further embodiments, the handle joint incorporates a ring portion of the open ring joint. In some embodiments, the handle joint incorporates a socket portion of the open ring joint.

In other embodiments, also disclosed is a method of manufacturing a chair with an adjustable lumbar support as disclosed herein. In some embodiments, the method may include manufacturing a chair, including a seat, seat back, legs, and other components for a chair. The method for manufacturing includes fabricating a linkage that includes a handle joint on one end and a lumbar joint on the other end. The handle joint and lumbar joint each may be manufactured as combinations of ball and socket, open ring, pin and slider, hinge, or other joints. This method may include fabricating the linkage and joint assembly as one components or individual manufacturing the linkage and then the joint components that attach to the linkage. Additionally, the method of manufacturing may also include fabricating a lumbar support, a lumbar side linkage retainer, a handle side linkage retainer and a handle. In some embodiments, a seatback may be fabricated that includes a handle track and a lumbar support track. The handle track may be fabricated to be near or along the edge of the seat back. The parts may be fabricated in a modular fashion to allow them to be assembled by a retailer or consumer prior to use and be easily shipped. In some embodiments, the joints will be fabricated in separate complementary components that are later assembled together. For example, the ball and socket joint may be manufactured so that there is a ball or socket connected to the lumbar support, and a socket or ball connected to the linkage. Similarly, the same could be applied to the connection between the linkage and the handle and for each of the joints disclosed herein.

The linkage and other components discussed herein may be fabricated from plastic, wood, metal, or other materials. The components may be fabricated using injection molding for plastic, welding, stamping, or other known fabrication methods.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
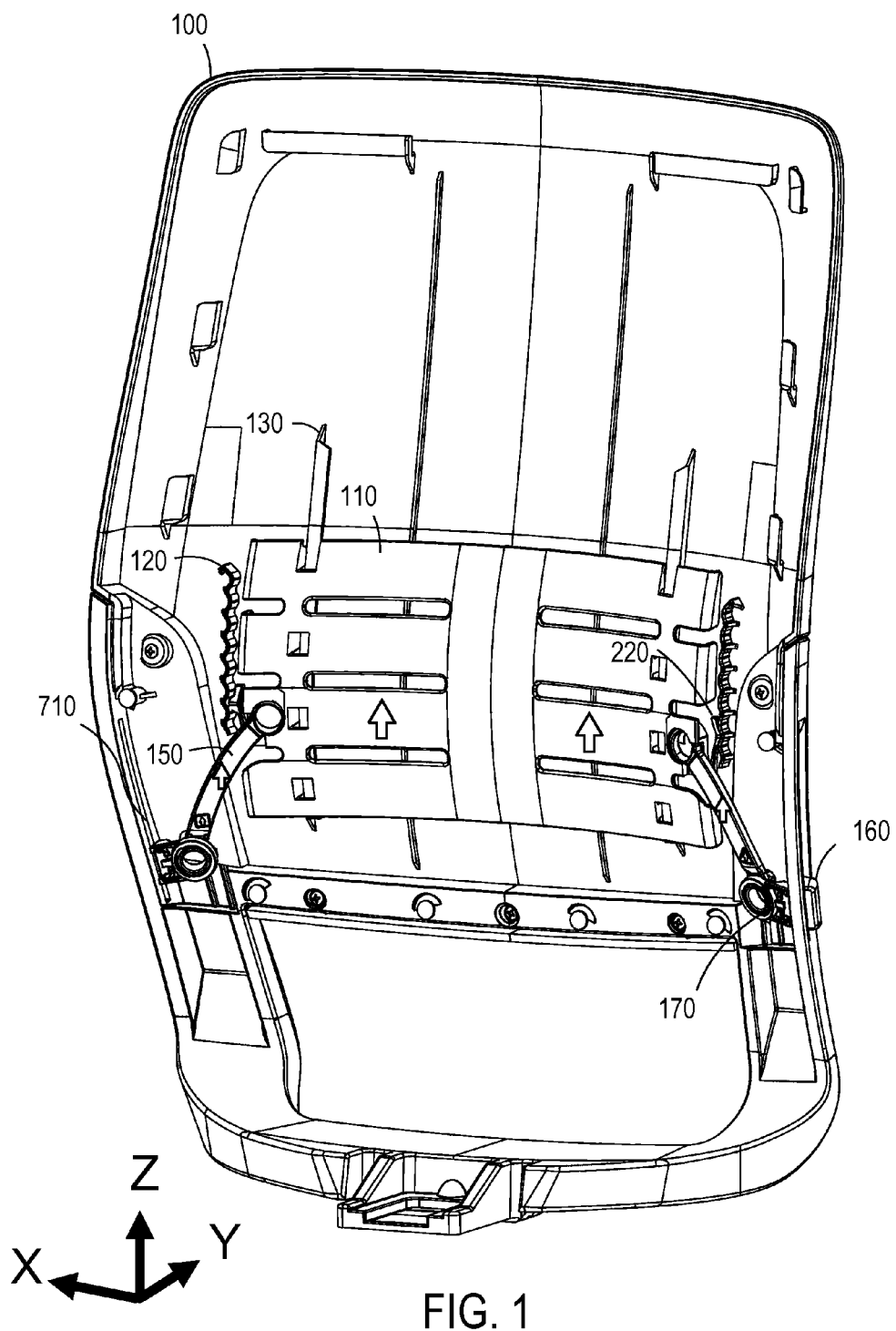
FIG. 1 depicts, in accordance with an embodiment of the invention, a perspective view of a chair back that includes a lumbar support adjustment mechanism.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this invention belongs. Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Overview

FIG. 1 illustrates an example of a lumbar support adjustment mechanism according to the present disclosure. The seat back 100 has an adjustable lumbar support 110 that may be adjusted in a vertical direction (up or down) by travelling along, for example, track 130. However, in other embodiments, the two tracks 130 that guide the lumbar support 110 may have different positions. For instance, the two tracks 130 may be spread further apart or closer together on the seat back 100, or the lumbar support 110 may run on a single track 120 in the middle of the seat back 100.

Seat back 100 may be any suitable seat back that includes an adjustable lumbar support 110. This may be an office chair seatback, a mesh back seat back 100, a wire frame seatback, an automobile seat, an airplane set, or any other chair or fixture that includes an adjustable lumbar support 110. The seat back 100 and lumbar support 110 may be fixed to any chair, including an office chair, with a seat back 100, seat, legs, and other components.

Tracks 130 may be smooth plastic guide rails along which track runners on the lumbar support 110 may engage and slide along. In some embodiments, this may be smooth plastic surfaces that snuggly fit enough to hold a position but also slide with respect to each other when sufficient force is applied. In other embodiments, the tracks 130 may be metal tracks, or made of other suitable materials. In still other embodiments, the tracks 130 may engage rollers that are attached to the lumbar support 110, or the tracks 130 have rollers that engage a suitable portion connected to the lumbar support 110.

In this embodiment, the lumbar support 110 is held in position by position fixing track 120. Position fixing track 120 has depressions spaced at regular intervals along the track 120 into which position fixing member 220 fits, and thereby holds the position of lumbar support 110. Position fixing member 220 may be connected directly to lumbar support 110, or may be a machined component of lumbar support 110, or attached in any suitable method. In other embodiments, the position fixing track 120 may be oriented so a position fixing member 220 connected to the handle—rather than the lumbar support 110, may engage it and fix the position of the lumbar support 110.

Lumbar support 110 may adjusted up and down by force transmitted from the handle 160 through the linkage 150. Linkage 150 may be an elongate, rigid member that connects to lumbar support 110 with a joint to allow for relative movement between the lumbar support 110 and the linkage 150. Linkage 150 in turn receives force from the handle-side linkage retainer 170 which is connected to handle 160. Accordingly, a user sitting on a chair may reach to the side and slide handle 160 up or down. This action will transmit force through the joints and linkage 150 and adjust the lumbar support 110 up and down along the user's back. A user may then adjust the lumbar support 110 to the appropriate height while sitting down.

During adjustment, the handle 160 moves along track 710. In some embodiments, track 710 follows or nearly follows the outer edge of the chair back 100 to allow for easy access by the user while seated in the chair. In some embodiments, the track 710 may be within 1 inch, 2 inches, half an inch or other distances from the outer edge of the char back 100. For some chairs, the back 100 or outer edge of the chair will fan outwards or away from the center line along the direction of the indicated X vector illustrated. Accordingly, when the handle 160 is adjusted upward, the handle 160 will move away from the center line in the X direction while simultaneously moving in the Z direction for adjustment. At the same time, the lumbar support 110 will be moving upward along track 130 which generally may be a vertical track that is generally straight. Accordingly, tracks 130 and 710 will diverge from each other along the X direction while being adjusted upward, and converge on each other while being adjusted downward. Accordingly, the adjustment mechanism must compensate for this movement of the handle 160 away from the center line and away from the lumbar support 110 in the X direction while being adjusted upward.

FIG. 1 also illustrates that handle 160 is positioned lower than lumbar support 110, due to linkage 150 being oriented at an angle from the horizontal between the lumbar support 110 and the handle 160. This is advantageous, as it allows the handle to be in a lower position along the seat back 100 than the lumbar support 110. Accordingly, a user can more easily apply force to the handle 160 at a position lower down the seat back 100, because their arm will be more extended. Contrarily, if the handle 160 were at the same height it may require more effort for a user to adjust the lumbar support 110 because their arm would be bent at an angle. In some embodiments, however, the linkage 150 will be angled upward, and the handle 160 will be higher than the lumbar support 110.

Figure 2:
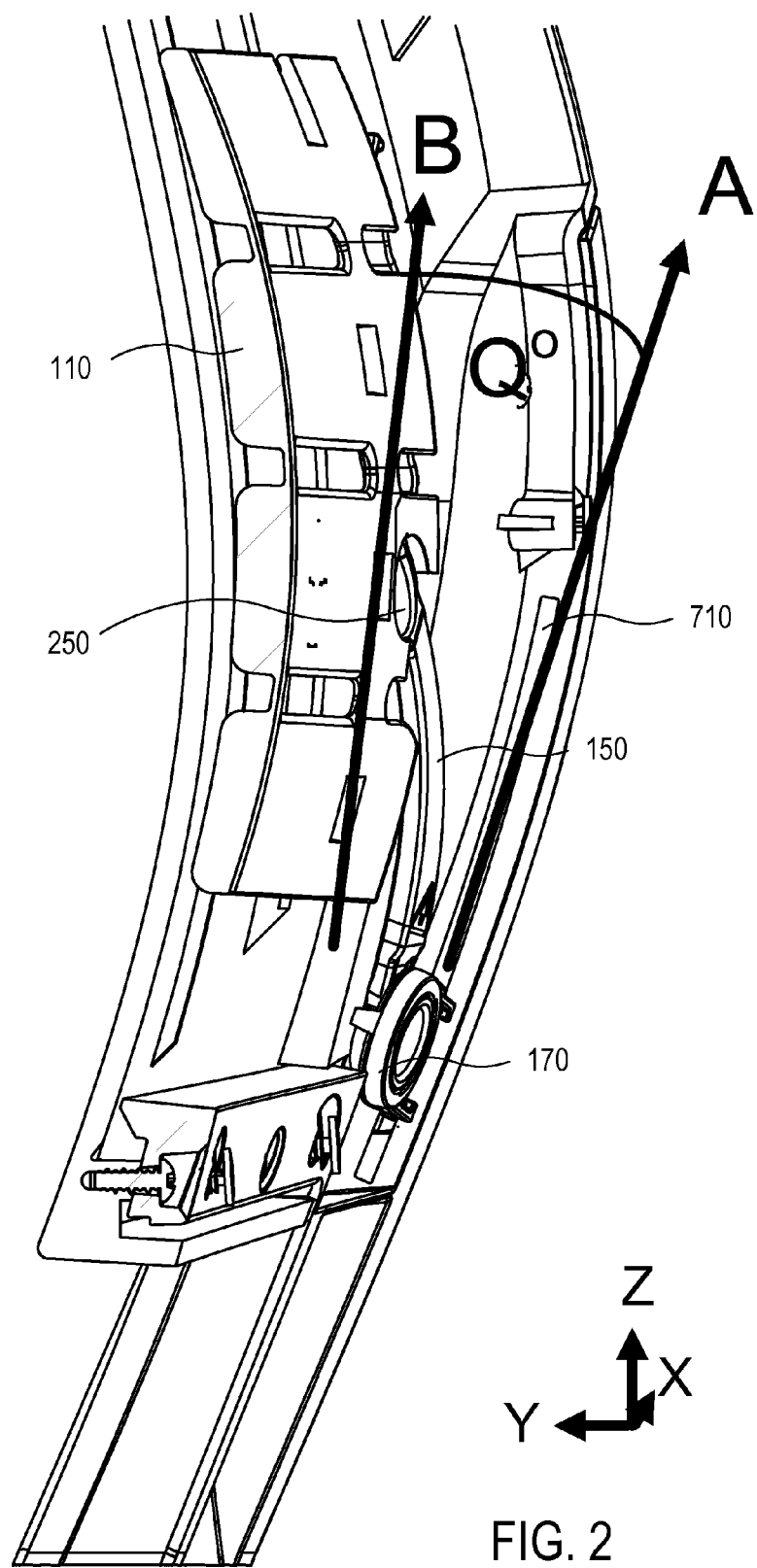
FIG. 2 depicts, in accordance with an embodiment of the invention, a perspective view of a open ring embodiment of an adjustment mechanism.

Similarly, as illustrated in FIG. 2, track 710 will diverge away from the user's back in the Y direction because the seat back 100 will generally curve backward or away from the user towards the top of the chair back 100. This movement is illustrated by arrow A in FIG. 9. Additionally, as the lumbar support 110 is positioned in the center of the seat back 110, it will more closely follow the user's back and will generally not diverge as far away as the edges of the seat back 110 towards the top. Accordingly, there will be an angle between the two paths (A & B) that is Q°. This angle will result in a divergence of the handle 160 from the lumbar support 110 in the Y direction as the handle 160 will follow the A vector, and the lumbar support 110 will approximately follow the B vector. Accordingly, the linkage 150 mechanism must compensate for divergence in the Y direction as well as in the X direction.

Pin and Slider

Figure 3:
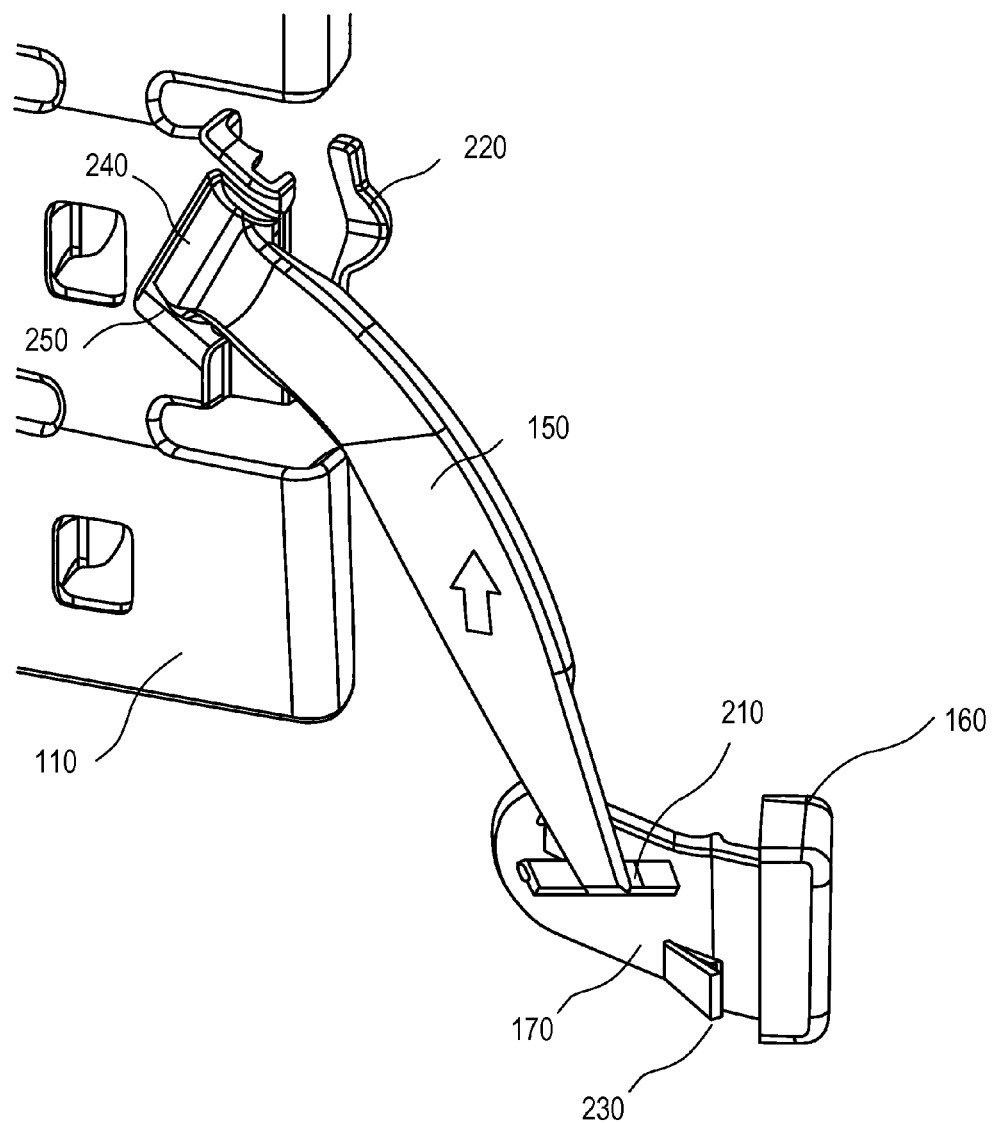
FIG. 3 depicts, in accordance with an embodiment of the invention, a perspective view of a lumbar support incorporating a pin and slider embodiment of an adjustment mechanism.

FIG. 3 illustrates an embodiment of the lumbar support adjustment mechanism that includes a pin and slider joint that connects the handle 160 to the linkage 150. Additionally, the mechanism includes a hinge type joint for connecting the linkage 150 on the lumbar side. Accordingly, in this embodiment, the lumbar support 110 includes a lumbar side linkage retainer 250. The lumbar-side linkage retainer 250 includes a socket for retaining the hinge type linkage lumbar joint 240. This joint system allows for rotation about an axis that is roughly in the plane of the seat and at an angle to a vertical line. This single degree of freedom allows the connection between the linkage 150 and the lumbar support 110 to be relatively rigid, and little energy is lost due to unnecessary friction from a loose fit. In other embodiments, the configuration may be reversed and the socket portion of the hinge joint may be incorporated into the lumbar joint 240.

Illustrated in FIG. 3, on the handle side of the linkage, a pin and slider joint is included. In this embodiment, the pin and slider joint has approximately 4 degrees of freedom. The pin in slider joint is composed of a slot in the handle-side linkage retainer 170, and a pin that rides in the slot of the linkage handle joint 210. In other embodiments, the configuration may be reversed, and the slot may be on the handle joint 210 and the pin may be incorporated into the handle-side linkage retainer. The pin and slider joint allows the linkage 150 to rotate in the slot of the handle-side linkage retainer 170 with three degrees of freedom, and also slide in a direction that is approximately in the X direction to allow for divergence of the handle 160 from the center line (horizontal to the ground and away from or towards the longitudinal axis of the chair/person). In some embodiments, the pin could be any suitable shape that can articulate on the inside of the slot, and also slide along the slot laterally. In some embodiments, the pin may have a rounded flat surface and along be permitted to rotate with 1 degree of freedom, and also slide laterally. This would restrain the pin from rotating about an axis that would run longitudinally with the slot. In other embodiments, the pin would also be able to rotate about the longitudinal axis of the slot within ranges set by physical boundaries in the joint.

FIG. 3 also illustrates the handle track retainer 230 that rides along the 710 track for the handle 160. The handle track retainer 230 may slide along the track 710 using contact between flat surfaces, or may slide along rollers that may be placed on one portion of the track 710 or handle 160. The handle track retainer 230 ensures the connection between the handle 160 and the track 710 will fit as tightly as possible to prevent mechanical energy from being dissipated rather than translated during adjustment of the lumbar support 110. The handle track retainer 230 may be any suitable shape that is compatible or complementary with the geometry of the chair back 100 and associated track 710 so that the handle track retainer 230 may allow the handle 160 to be retained and slide up and down track 710. In some embodiments, handle track retainer 230 may include a spring feature for removably inserting the handle 160 in the track 710. In other embodiments, handle track retainer 230 may include other shapes, such as sphere, wedge, box, or other suitable shapes. In some embodiments, the handle track retainer will have complementary surfaces to the track 710 to prevent any non-translational movement of the handle that is not along the track 710. This will ensure that maximum force is transmitted form the user pushing on the handle. In other embodiments, the handle track retainer 230 will only loosely lock the handle 160 into the track 710, to avoid excess friction resisting the adjustment.

FIG. 3 also illustrates position fixing member 220, which temporarily fixes the position of the lumbar support 110 after adjustment. The position fixing member 220 may also be incorporated into the ball and socket embodiment, open ring embodiment, and/or any other embodiments and is therefore not required or limited to the pin and slider embodiment. In one embodiment, the position fixing member 220 contains a bulge or stop that fits inside a depression on a position fixing track 120 (not pictured in FIG. 3). The stop is rounded in some embodiments so it may rather easily be pushed into the next depression with mechanical force transmitted by the handle 160. The retaining force of the position fixing member 220 must be large enough to hold the lumbar support 110 in place, but weak enough so a user can overcome its retaining force being pushing upward or downward on the handle 160. In other embodiments, the stop or bulge may be square triangle, conical, or other suitable shapes. Some of these shapes may require a user to depress or release the stop from the depression in the position fixing track 120 in order to adjust the lumbar support 110. In other embodiments, the user's force pressed on the handle alone will be enough to force the position fixing member into 220 the next depression.

The position fixing member 220 may also include a spring feature. As illustrated in FIG. 3, position fixing member 220 has an elongate arm 220 that will spring back forward when depressed. This will provide the force necessary to retain the lumbar support 110 in a fixed position with respect to the position fixing track 120. The force the position fixing member 220 exerts upon depressing its arm may be optimized by manipulating the geometry (e.g. thickness, shape) of the arm that connects the bulge or stop of the position fixing member 220 to its base connection to the lumbar support 100. For example, the thicker the plastic used for the arm, the more position retaining force the member 220 will exert on the depressions of the position fixing track 120. Accordingly, instead of a flexible plastic arm, other mechanisms could be used for the position fixing member 220. For instance, the position fixing member 220 could include a spring loaded arm, or other mechanical feature that would exert retractable physical force on the depressions of the position fixing track 120.

Figure 4:
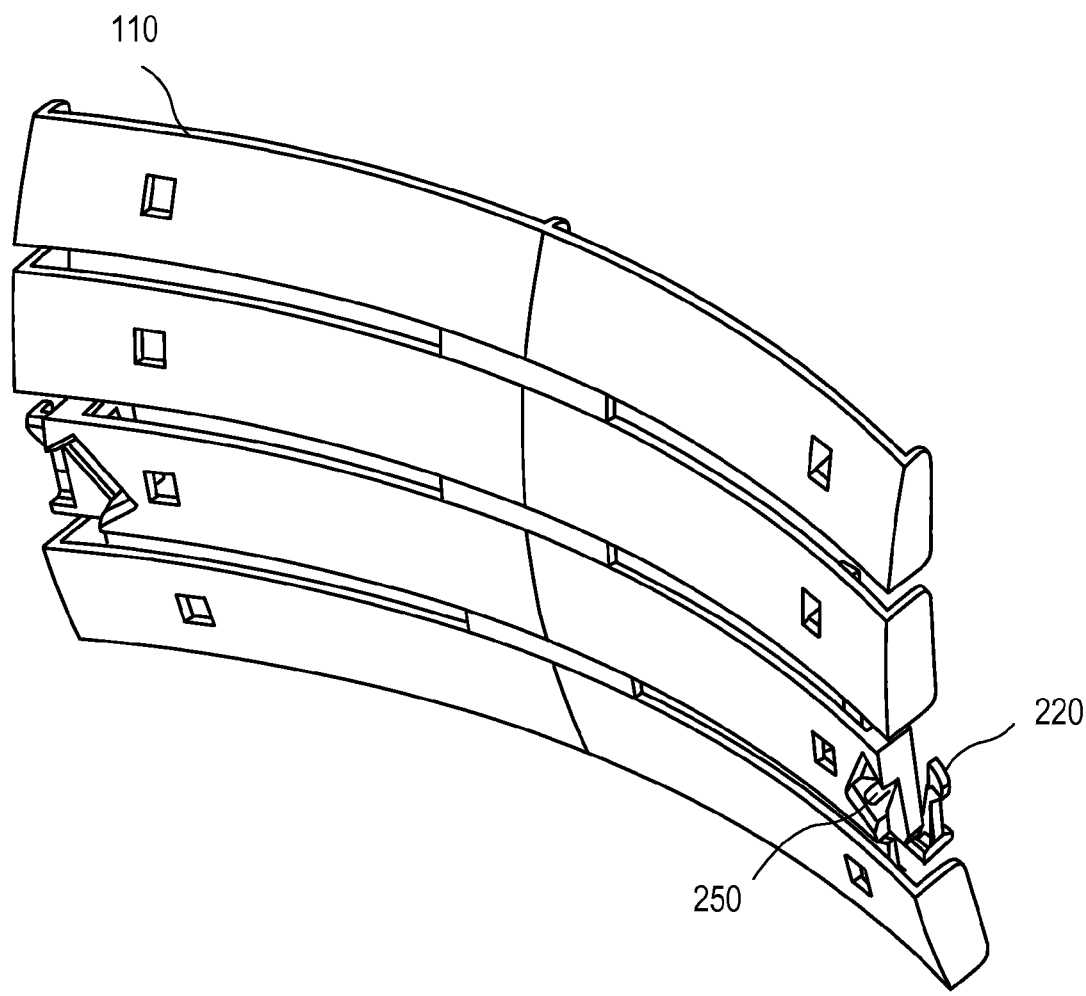
FIG. 4 depicts, in accordance with an embodiment of the invention, a perspective view of a socket portion of a joint incorporated into a lumbar support in a pin and slider embodiment of an adjustment mechanism.

FIG. 4. Illustrates an embodiment of the lumbar support 110. The lumbar support 110 includes position fixing members 220 on either or both sides of lumbar support 110 that ride along the position fixing track(s) 120. Additionally, the lumbar support 110 may include one of many various lumbar side linkage retainers 250. These may be various complementary joints that connect with the complementary joint on the lumbar side of the linkage 150. Illustrated in FIG. 4 is the socket for a hinge type joint with one degree of freedom.

Figure 5:
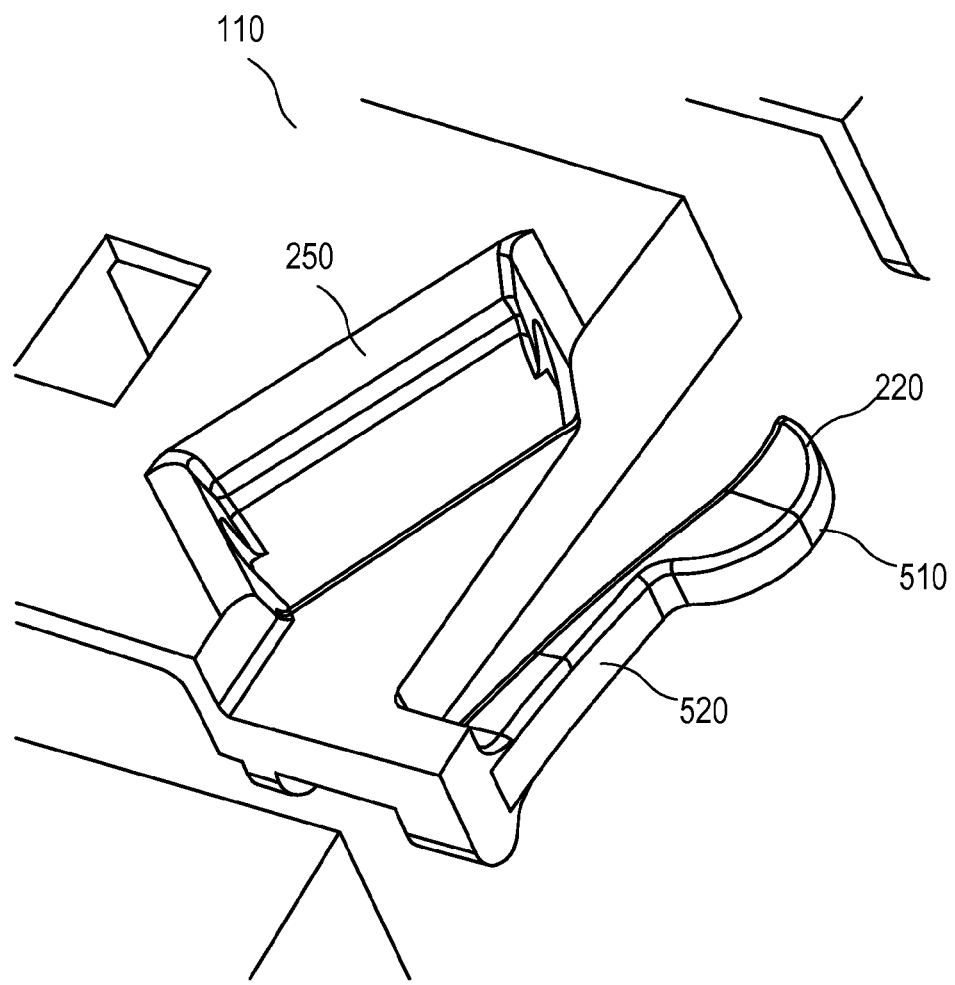
FIG. 5 depicts, in accordance with an embodiment of the invention, a close up view of a socket portion of a joint incorporated into a lumbar support in a pin and slider embodiment of an adjustment mechanism.
Figure 5:
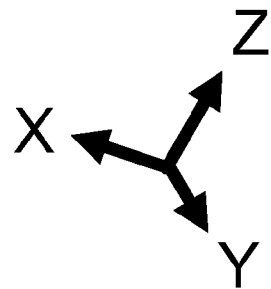

FIG. 5 is a close-up of position fixing member 220 and lumbar side linkage retainer 250. In this embodiment, position fixing member has a stop (or bulge) 510 and spring member 520. The stop 510 may be any suitable shape to allow the stop 510 to slide in and out of depressions in the position fixing track 120. The rounded edge will allow the stop 510 to exert a lateral force in addition to the vertical force to push the stop 510 in the X direction indicated in FIG. 5 towards the lumbar support. The curved nature of the stop 510 will increase the force component in the X direction as the stop 510 begins to bend backwards towards the lumbar support 110 and slide upward or downward, which will help the lumbar support 110 and position fixing member 220 to be forced into the next position on the position fixing track 120. As discussed above, the stop 510 may be designed in other shapes, some of which may require the user to depress or release the stop 510 from the depression in order to adjust the lumbar support 110.

Also illustrated is the lumbar-side linkage retainer 250. This embodiment includes a socket for a single axis hinge type joint, which has an axis of rotation that is oriented roughly at 45°, 50°, 60°, 70°, 85°, 15°, 10°, 5° degrees or other suitable angle from the vertical or horizontal (Z or X direction). Here, the lumbar-side linkage retainer 250 is a socket formed in the lumbar support 110 that would receive the male portion of the hinge joint attached to the linkage 150. In some embodiments, the socket could be machined into the lumbar support 110, or could be a separate attachment to the lumbar support 110.

Figure 6:
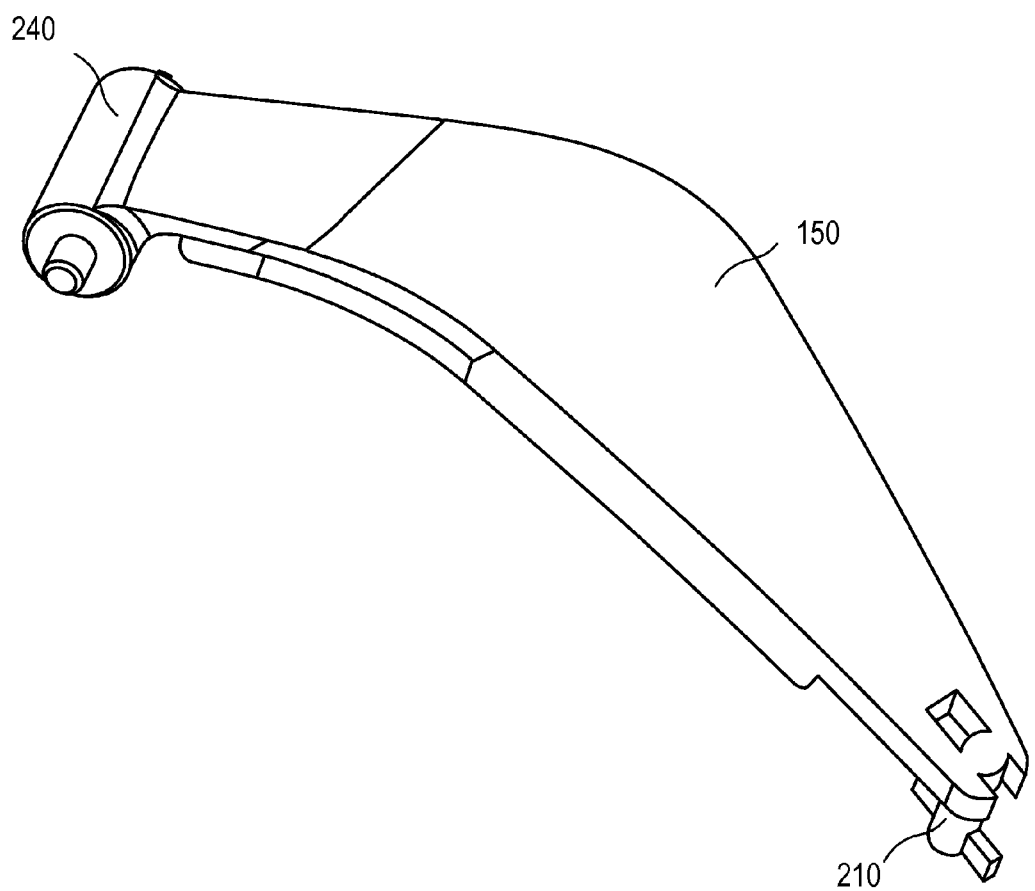
FIG. 6 depicts, in accordance with an embodiment of the invention, a perspective view of a linkage incorporating a pin and slider embodiment of an adjustment mechanism.

FIG. 6 illustrates an embodiment of the linkage 150 that includes a lumbar joint 240 and a handle joint 210. In this embodiment, the linkage 250 is an elongate, rigid member that connects the two joints. The primary function of the linkage 150 is to transmit the force from the handle 160 to the lumbar support 110. The linkage 150 may be constructed of plastic, metal, wood, or other suitable materials and be in a variety of shapes including rectangular, the shape pictured in FIG. 3, rod shapes, or other suitable shapes. FIG. 6 illustrates an embodiment of the handle joint that includes the pin portion of the pin and slider joint. As illustrated, the pin may have a piece that may be inserted at a specific angle to align a set of wings with the slot on a handle-side linkage retainer 170, so that the pin may be inserted through the slot. Then, the linkage 150 may be rotated into place, at which point the wings or key flanges would rotate to a position that would restrict the pin from exiting the slot. Accordingly, in this embodiment, the flanges or wings on the pin portion of the pin and slider joint must be in the correct orientation in order to impede the pin from exiting the slot and becoming detached from the handle-side linkage retainer 170.

In other embodiments, a variety of other shapes and configurations of the pin portion of the pin and slider joint may be utilized. For instance, instead of wings, the pin may include spring loaded flanges that retract and then spring forward when pushed through the slot. In other embodiments, the pin may include a cap that attaches using a screw or other connection mechanism that prevents the pin from exiting the slot. In another embodiment, a variety of other shapes for the flange may be utilized, including a square, wedge, circular, cone, or other suitable shapes. In some embodiments, the shape of the pin (and particularly the surface facing the slot) may dictate the range of motion the joint will allow as the pin will restrict rotational motion when the pin contacts the slot walls.

Figure 7:
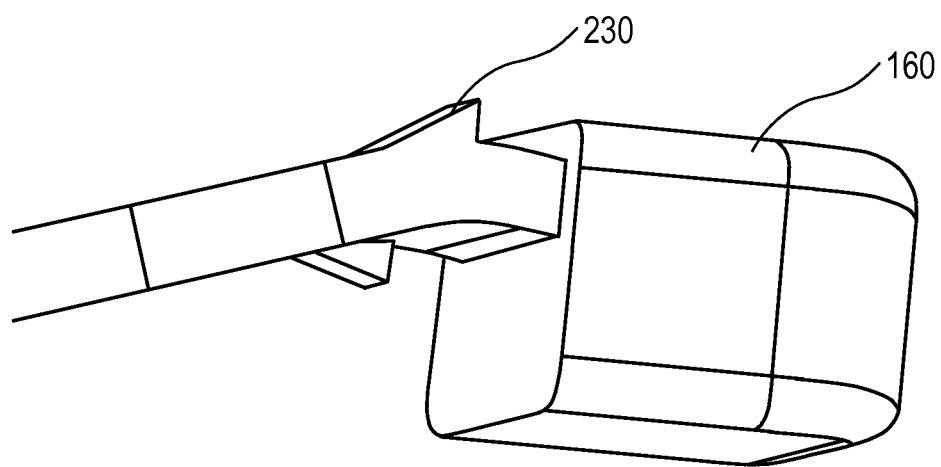
FIG. 7 depicts, in accordance with an embodiment of the invention, a perspective view of a handle.

FIG. 7 illustrates an embodiment of the handle 160 and the handle track retainer 230. As illustrated, the handle track retainer 230 may include any suitable shapes for retaining the handle 160 assembly in the track 710. For instance, the retainer 230 may include a wedge shape with a flat, smooth edge that slides along the track 710. Accordingly, the handle track retainer 230 should be complementary to the handle track 710 and allow it to slide along the handle track 710.

Additionally, handle 160 may be any suitable shape and made from any suitable materials to allow a user to easily grip and slide the handle 160. For instance, the handle 160 may be a rounded rectangle piece made from plastic or rubber. This simplifies construction but still easily allows for adjustment.

Figure 8:
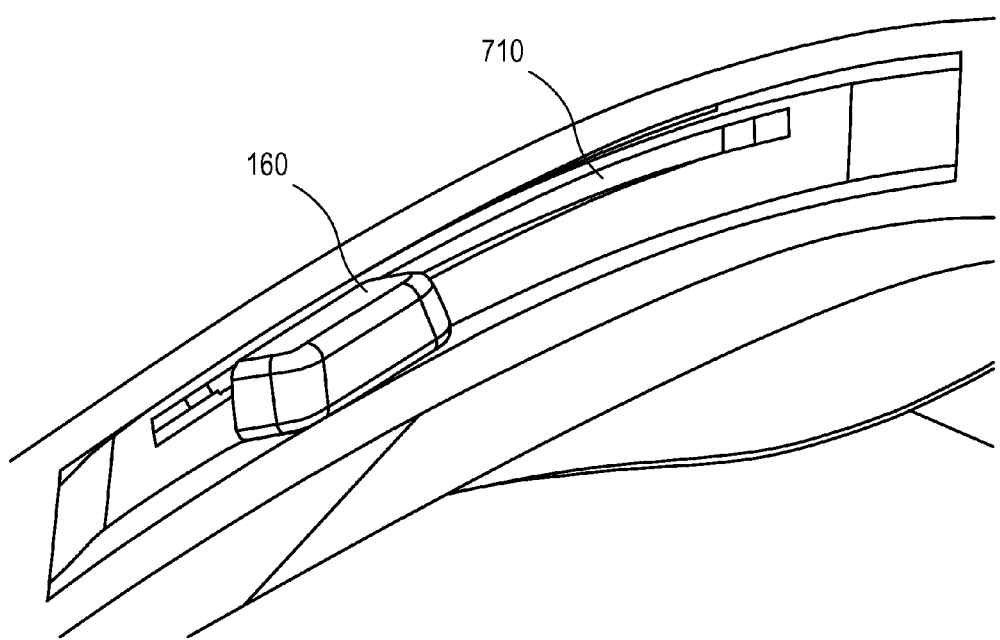
FIG. 8 depicts, in accordance with an embodiment of the invention, a side view of a handle and track.

FIG. 8 illustrates the handle track 710 and the handle 160 sliding along the track 710. In some embodiments, the handle track 710 may be a groove along the side of the chair back 100 that would allow the handle 160 to fit within the groove. In this embodiment, the area around the slot would be perpendicular and flat with respect to the slot. Accordingly, the handle retainer 230 may then have a flat surface that would ride along the flat surface of the handle track 710.

Open Ring

In addition to the pin and slider embodiment, the joints of the linkage 150 may also use an open ring configuration. This embodiment is similar to the pin and slider embodiment, but utilizes different joints on either side of the linkage 150 (in this case open ring joints). As illustrated, the linkage 150 in this embodiment may have an open ring joint for its lumbar joint 240 and its handle joint 210. In some embodiments, the linkage 150 may have an open ring joint on one side, and a ball and socket on the other. In other embodiments, the linkage may have a hinge joint on one side and a ball and socket or open ring joint on the other. Also, many other combinations of the joints disclosed herein or other joints may be utilized to accommodate the divergence and convergence of the handle from the lumbar support during adjustment.

An open ring joint may have three degrees of freedom that allow rotational movement in any direction, but not translational movement. An open ring joint is similar to a ball and socket joint, but does not require as much material (as it is an open ring rather than a whole ball or whole socket) and is easier to assemble and remove, because the socket portion does not completely enclose the inner portion (i.e. the ring). In some embodiments, an open ring joint may have a circular, elliptical or other suitably shaped cross section. In some embodiments, the outer surface of the ring portion of the open ring joint will be spherical shaped. Although in this embodiment, the range of motion may be limited by the handle side linkage retainer 150 (that half of the joint may prevent the joint from rotating moving within a certain range), in some embodiments there may be larger or smaller ranges.

Because the open ring joint does not include translation, it would likely transmit force more efficiently than the pin and slider joint described above. That is because the pin and slider joint does not fit as tightly and would lose energy due to twisting and other motions that are not productive. In contrast, the open ring joint does not allow any translation, and tightly fits. Therefore, any lateral forces (non-rotational) would be efficiently transmitted to the lumbar support 110 so a user may more easily raise and lower the lumbar support 110. This embodiment uses the linkage 150 length and the positioning (vertically) of the two joints to accommodate for the divergence and convergence of the handle 160 from the lumbar support 110.

Figure 9:
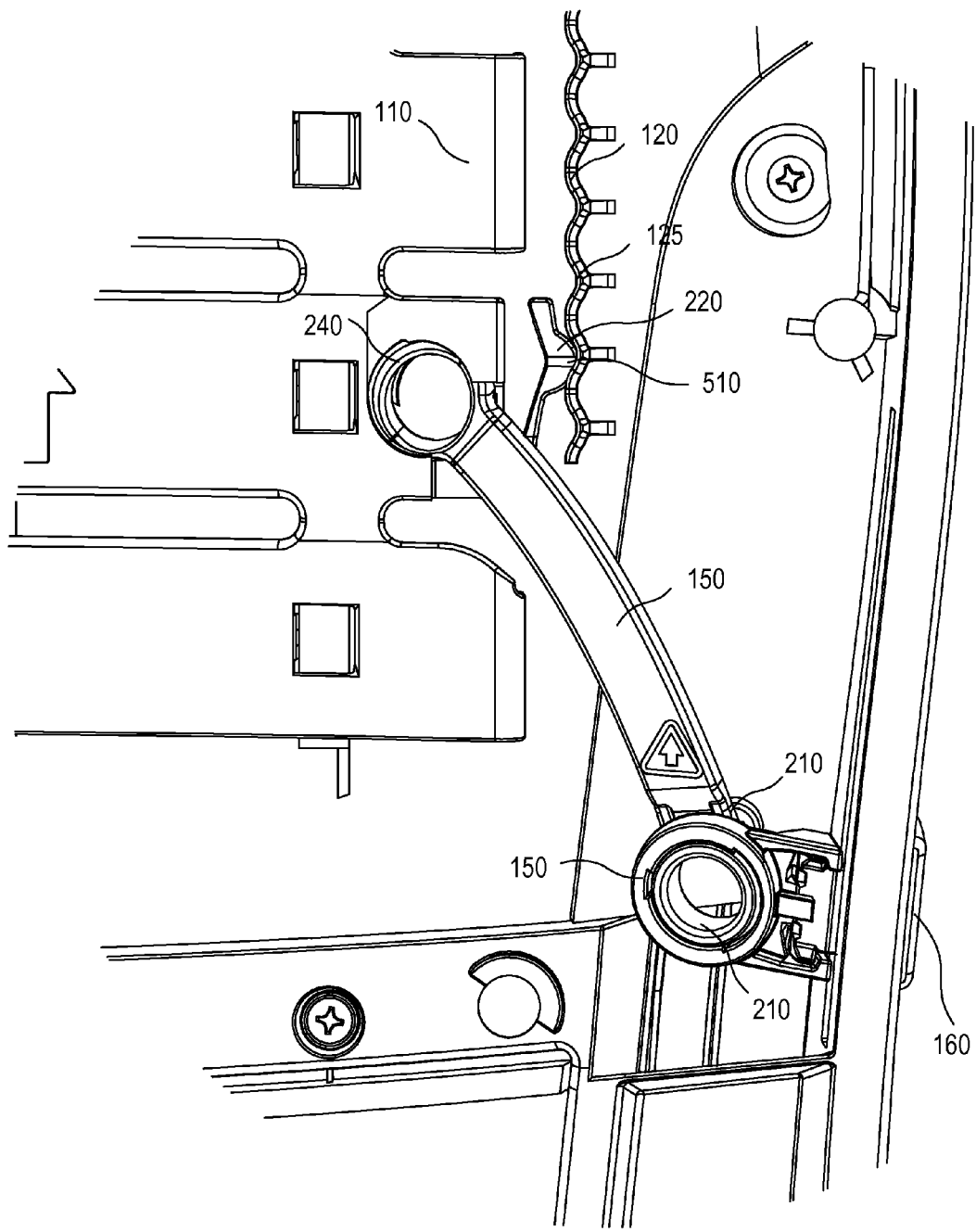
FIG. 9 depicts, in accordance with an embodiment of the invention, a perspective view of an open ring embodiment of a lumbar support adjustment mechanism.

FIG. 9 also illustrates an embodiment of the position fixing member 220 and position fixing track 120. As shown, the position fixing member 220 includes stop 510. The stop 510 is guided to a resting position in the bottom of depressions 125 in the position fixing track 120 where it holds the position of the lumbar support 110. For instance, the stop 510 is connected to an arm that is positioned so that it applies a force in the direction of the position fixing track 120. The lumbar support 110 may be fixed at a position at any of the depressions 125 along the position fixing track 120. In other embodiments, different shapes and constructions may be utilized for the position fixing track 120, depression 125, and the position fixing member 220 and stop 510. As discussed herein, the stop 510 may be any suitable shapes and constructions.

Figure 10:
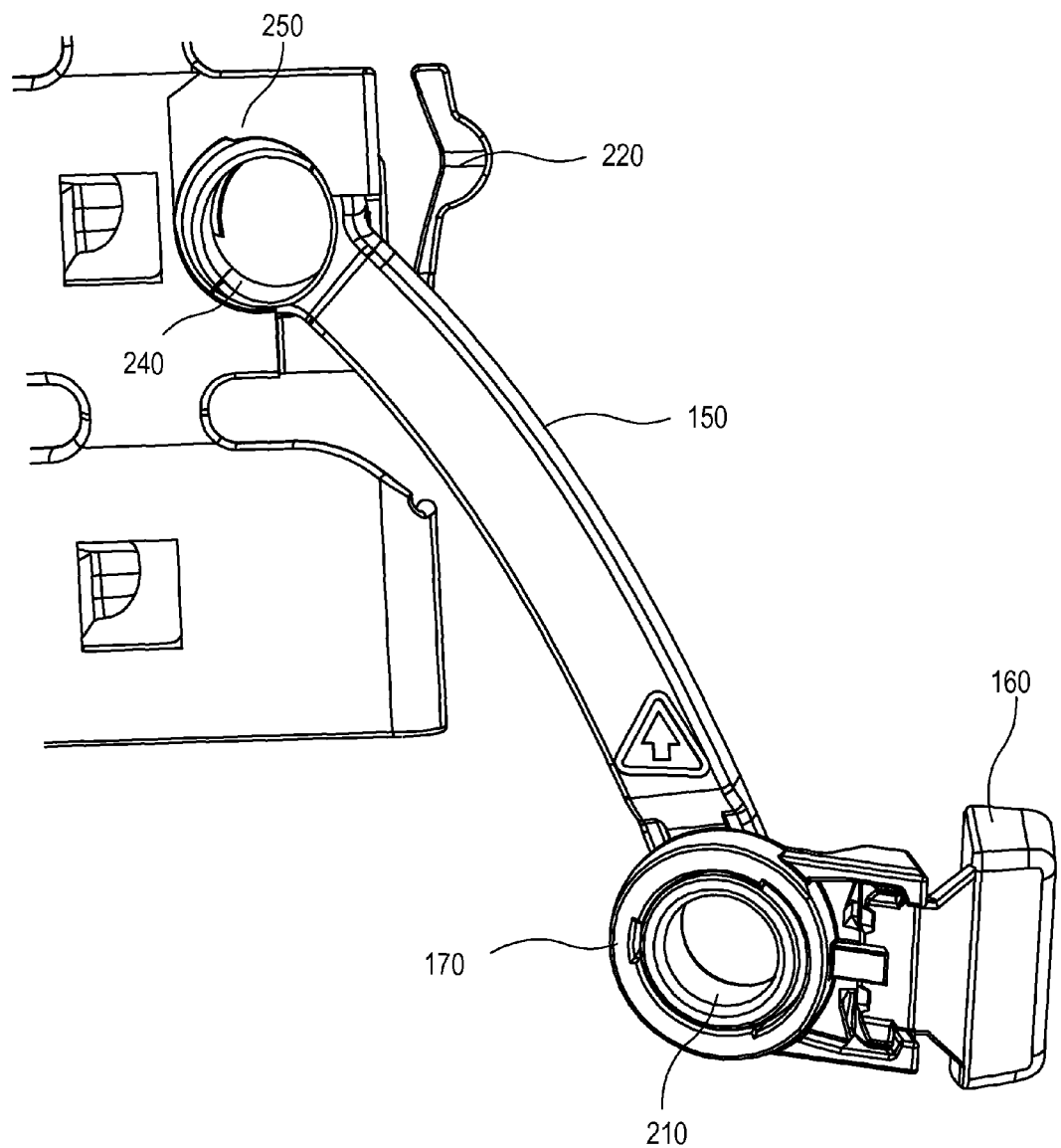
FIG. 10 depicts, in accordance with an embodiment of the invention, a front view of an open ring embodiment of a lumbar support adjustment mechanism.

FIG. 10 illustrates an isolated view of the open ring embodiment. In this embodiment, the handle 160 includes a handle-side linkage retainer 170 that functions as a socket portion of the open ring joint for the handle joint 210 to connect. The linkage retainer 170 may not include any hinge joints and thereby provide a rigid mechanism that transmits the force from the handle 160 through the handle joint 210. As illustrated, the handle-side linkage retainer 170 may include the socket portion of the open ring joint. This encloses or fits around the ring portion of the open ring joint that extends or is part of the handle joint 210. In other embodiments, the handle joint 210 may include the socket portion of the open ring joint and the handle-side linkage retainer 170 may include the ring portion of the open ring joint.

Figure 11:
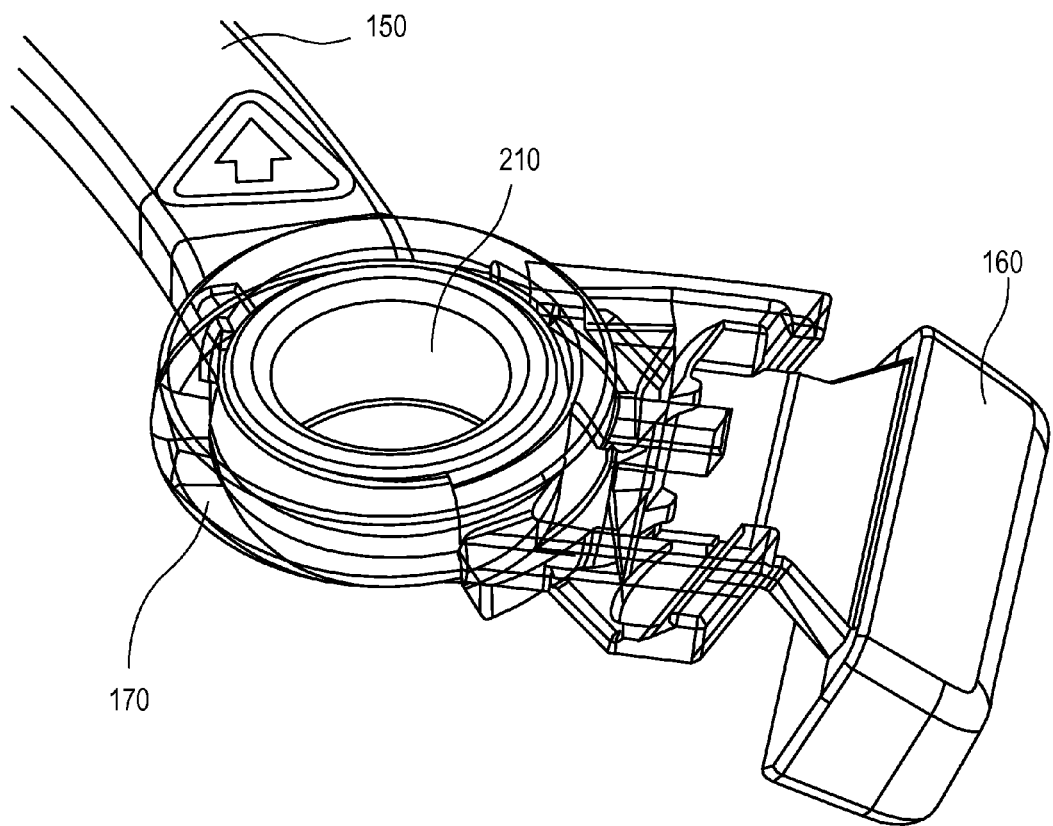
FIG. 11 depicts, in accordance with an embodiment of the invention, a perspective view of an open ring joint with the handle portion of the joint being illustrated as transparent.

FIG. 11 illustrates a close up view of the handle joint 210 and the handle-side linkage retainer 170. As illustrated, the handle joint 210 in some embodiments may fit inside the handle-side linkage retainer 170. As shown, the handle joint 210 may include a rounded, ring surface (the ring portion of the open ring joint) that articulates on the inside of the ring socket that is part of the handle-side linkage retainer 170. This construction allows for three degrees of freedom, without as much bulk and fabrication as required for the ball and socket joint.

Ball and Socket

Figure 12:
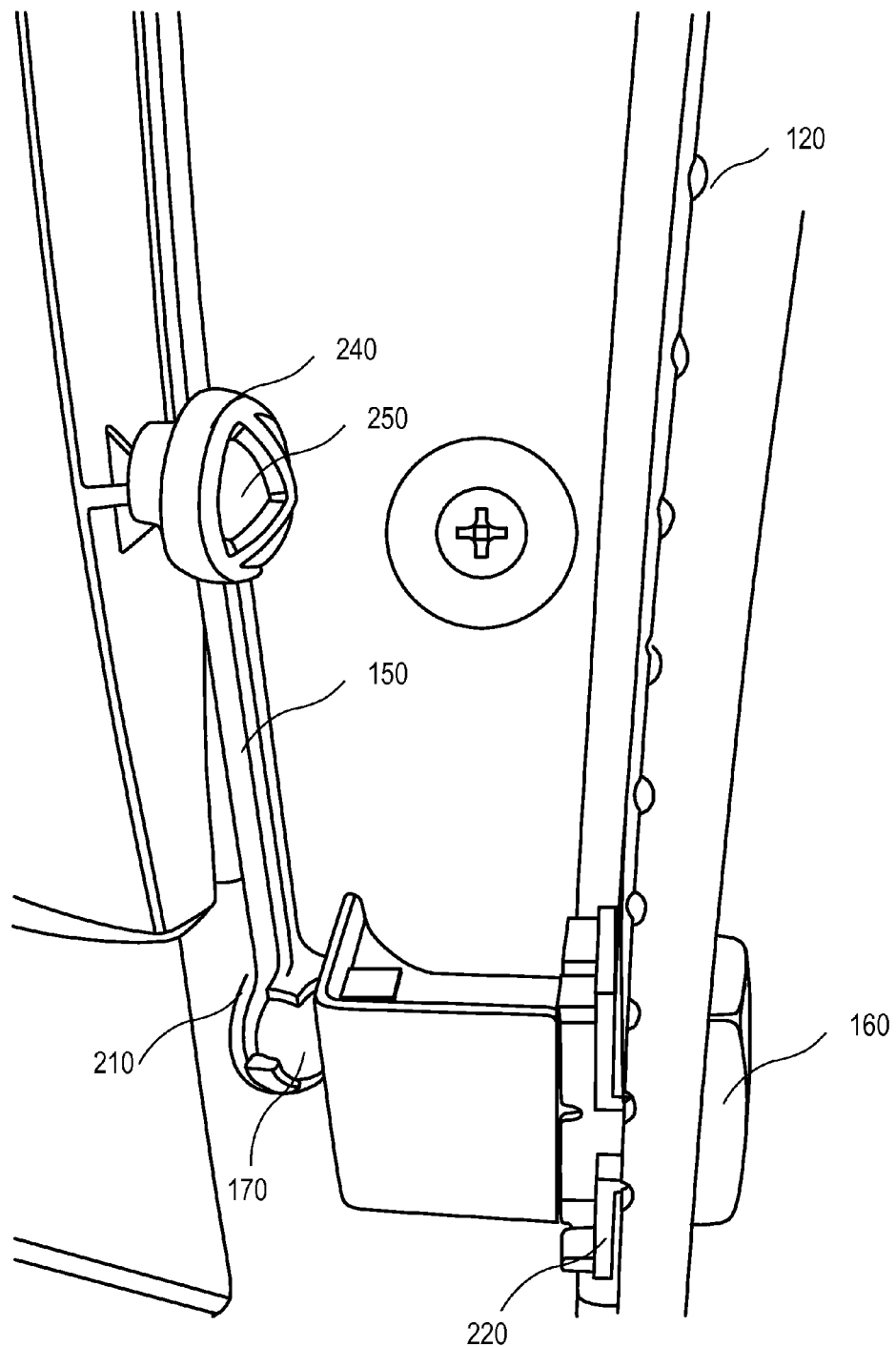
FIG. 12 depicts, in accordance with an embodiment of the invention, a perspective view of a ball and socket embodiment of a lumbar support adjustment mechanism.

FIG. 12 illustrates an embodiment of the ball and socket embodiment. As illustrated, the system includes a linkage 150 that has two ball and socket joints in place of open ring joints. Accordingly, the lumbar-side linkage retainer 240 includes a socket portion of the ball and socket joint that encloses a ball portion or lumbar joint 250 on the linkage 150. In other embodiments, this configuration may be reversed, with for example, the ball being the lumbar-side linkage retainer 240. As in the open ring joint embodiment, the ball and socket joints have three degrees of freedom.

FIG. 12 also illustrates another embodiment of the position fixing track 120 that is integrated with or near the handle track 710. This embodiment may save on manufacturing costs and complexity, because it may not require a separate position fixing track 120, and a separate position fixing member 220 to be separately integrated into the lumbar support 110. As illustrated, the handle 160 and handle-side linkage retainer 170 may include a position fixing member 220 that will fit in depressions or other nodules on the position fixing track 120.

Figure 13:
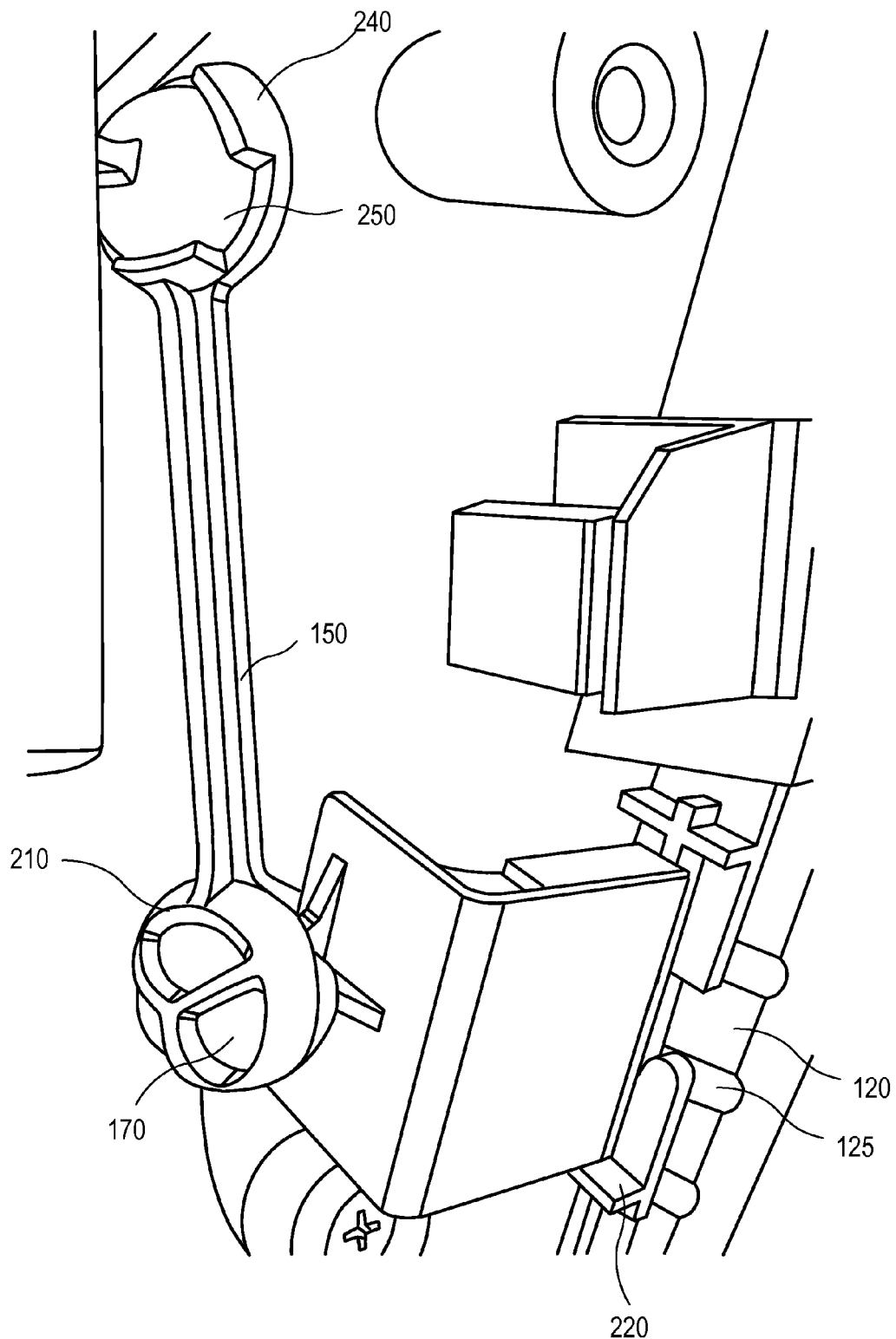
FIG. 13 depicts, in accordance with an embodiment of the invention, a perspective view of a ball and socket embodiment of a lumbar support adjustment mechanism.

FIG. 13 illustrates a close up view of the ball and socket joints and the position fixing member 220 and position fixing track 120. In some embodiments the position fixing member 220 may include a lever that allows a user to release it to adjust the lumbar support 110 up and down. This may be advantageous, because in this embodiment, the position fixing track 120 is integrated with the handle track 710 and is therefore easily accessible by the user. Accordingly, the locking mechanism could allow the depressions 125 to be deeper, since user release of the position fixing member 220 would be required to adjust the lumbar support 110. This may allow the lumbar support 110 to be more securely fixed into place.

As can be appreciated by one of skill in the art, the lumbar support system may include various combinations of the joints above. For example, a ball-and-socket joint on one side of the linked may be combined with an open ring on the other (either lumbar or handle side). Additionally, an open ring or ball and socket joint on the lumbar-side may be utilized with a pin and slider joint on the handle side. Additionally, ball and socket joints could be combined with hinge joints or other types of joints.

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

One skilled in the art will recognize many methods and materials similar or equivalent to those described herein, which could be used in the practice of the present invention. Indeed, the present invention is in no way limited to the methods and materials specifically described. In some embodiments, properties such as dimensions, shapes, relative positions, and so forth, used to describe and claim certain embodiments of the invention are to be understood as being modified by the term "about."

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A chair comprising:
   legs connected to a seat;
   a chair back connected to the seat;
   a lumbar support that is engaged with a first track, wherein the lumbar support follows and travels along the first track, and the first track is oriented vertically on the chair back, the lumbar support engaged with the first track to only allow translational movement of the lumbar support with respect to the first track;
   a handle that is engaged with a second track wherein the first track diverges from the second track, the handle engaged with the second track to only allow translational movement of the handle with respect to the second track;
   a lumbar-side linkage retainer connected to the lumbar support;
   a handle-side linkage retainer is connected to the handle; and
   a linkage with a lumbar joint and a handle joint, and wherein the lumbar joint is connected to the lumbar-side linkage retainer and the handle joint is connected to the handle-side linkage retainer wherein the lumbar joint and handle joint are configured to individually permit rotational movement but not translational movement.

2. The chair of claim 1 wherein the first track follows a vertical path.

3. The chair of claim 2, wherein the second track follows a path near the edge of the seat back.

4. The chair in claim 1, wherein the handle-side linkage retainer is integrated into the handle to form one piece.

5. The chair in claim 1, wherein there is an additional lumbar-side linkage retainer connected to the lumbar support to retain the linkage.

6. A lumbar support adjustment system for a chair comprising:
   a lumbar support that is engaged with a first track that follows and travels along a first path that is oriented vertically along a chair back, the lumbar support engaged with the first track to only allow translational movement of the lumbar support with respect to the first track;
   a handle engaged with a second track that follows a path that diverges from the first path, the handle engaged with the second track to only allow translational movement of the handle with respect to the second track;
   a linkage with a lumbar joint and a handle joint, wherein the lumbar joint is connected to the lumbar support and the handle joint is connected to the handle wherein the lumbar joint and handle joint are individually configured to permit rotational movement but not translational movement.

7. The lumber support adjustment system of claim 6, wherein a lumber side linkage retainer connects the lumbar support to the linkage.

8. The lumber support adjustment system of claim 6, wherein a handle side linkage retainer connects the linkage to the handle.

9. The lumbar support adjustment system of 6, wherein the lumbar joint is an open ring joint.

10. The lumbar support adjustment system of claim 6, wherein the lumbar joint is a ball and socket joint.

11. The lumbar support adjustment system of claim 6, wherein the lumbar joint is a hinge joint.

12. The lumbar support adjustment system of claim 6, wherein the handle joint is an open ring joint.

13. The lumbar support adjustment system of claim 6, wherein the handle joint is a ball and socket joint.

14. The lumbar support adjustment system of claim 6, wherein the handle joint is a pin and slider joint.

15. A lumbar support adjustment system for a chair comprising:
   a lumbar support that is engaged with a first track that follows and travels along a first path that is oriented vertically along a chair back, the lumbar support engaged with the first track to only allow translational movement of the lumbar support with respect to the first track;
   a handle that is engaged with a second track that follows a second path near an edge of the chair back and wherein the second path diverges from the first path, the handle engaged with the second track to only allow translational movement of the handle with respect to the second track;
   a linkage with a lumbar joint and a handle joint, and wherein the lumbar joint is connected to the lumbar support and the handle joint is connected to the handle, wherein the lumbar joint and handle joint are individually configured to permit rotational movement but not translational movement.

16. The lumber support adjustment system of claim 15, wherein a lumber side linkage retainer connects the lumbar support to the linkage.

17. The lumbar support adjustment system of claim 16, wherein the lumber-side linkage retainer incorporates a socket portion of the open ring joint.

18. The lumbar support adjustment system of claim 16, wherein the lumbar joint incorporates a ring portion of the open ring joint.

19. The lumbar support adjustment system of claim 16, wherein the lumber-side linkage retainer incorporates a ring portion of the open ring joint.

20. The lumbar support adjustment system of claim 16, wherein the lumbar joint incorporates a socket portion of the open ring joint.

21. The lumbar support adjustment system of claim 16, wherein a handle-side linkage retainer connects the linkage to the handle and wherein the handle side linkage retainer incorporates a socket portion of the open ring joint.

22. The lumber support adjustment system of claim 15, wherein a handle side linkage retainer connects the linkage to the handle.

23. The lumbar support adjustment system of claim 15, wherein the lumbar joint is a complementary portion of an open ring joint.

24. The lumbar support adjustment system of claim 15, wherein the lumbar joint is a complementary portion of a ball and socket joint.

25. The lumbar support adjustment system of claim 15, wherein the lumbar joint is a complementary portion of a hinge joint.

26. The lumbar support adjustment system of claim 15, wherein the handle joint is a complementary portion of an open ring joint.

27. The lumbar support adjustment system of claim 15, wherein the handle joint is a complementary portion of a ball and socket joint.

28. The lumbar support adjustment system of claim 15, wherein the handle joint is a complementary portion of a hinge joint.

29. The lumbar support adjustment system of claim 15, wherein the lumbar support is slidably engaged with the first track.

30. The lumbar support adjustment system of claim 15, wherein the lumbar support includes rollers that are positioned to roll along the first track.

* * * * *